US010743390B2

(12) United States Patent
Wang et al.

(10) Patent No.: US 10,743,390 B2
(45) **Date of Patent: *Aug. 11, 2020**

(54) OUT-OF-THE-BOX COMMISSIONING OF A CONTROL SYSTEM

(71) Applicant: SIGNIFY HOLDING B.V., Eindhoven (NL)

(72) Inventors: Xiangyu Wang, Eindhoven (NL); Emmanuel David Lucas Michael Frimout, Eindhoven (NL); Aloys Hubbers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,584

(22) Filed: Aug. 20, 2019

(65) Prior Publication Data

US 2019/0373706 A1 Dec. 5, 2019

Related U.S. Application Data

(63) Continuation of application No. 14/419,312, filed as application No. PCT/IB2013/056053 on Jul. 24, 2013, now Pat. No. 10,462,877.

(Continued)

(51) Int. Cl.
*H05B 47/105* (2020.01)
*H05B 47/18* (2020.01)
(Continued)

(52) U.S. Cl.
CPC ........... *H05B 47/105* (2020.01); *H05B 47/18* (2020.01); *F21V 23/0442* (2013.01); *H05B 45/00* (2020.01); *H05B 47/10* (2020.01); *H05B 47/185* (2020.01)

(58) Field of Classification Search
CPC ........... H05B 37/0227; H05B 37/0254; H05B 47/105; H05B 47/18; H05B 47/185; H05B 47/10; H05B 45/00; F21V 23/0442
See application file for complete search history.

(56) References Cited

U.S. PATENT DOCUMENTS

2002/0073338 A1* 6/2002 Burrows ............. H04L 41/0213 726/13
2006/0125426 A1* 6/2006 Veskovic ............... H05B 47/18 315/312

(Continued)

FOREIGN PATENT DOCUMENTS

DE 102005028206 A1 12/2006
JP 2004336169 A 11/2004

(Continued)

OTHER PUBLICATIONS

Cisco System, Catalyst 2960 Switch Software Configuration Guide, Sep. 2005, Cislo System, Release 12.2 (25)FX, pp. 12-1 to 12-30; (Year: 2005).

*Primary Examiner* — Raymond R Chai
(74) *Attorney, Agent, or Firm* — Akrash P. Belagodu

(57) ABSTRACT

The present invention is related to verifying an installed lighting system (300), in particular an Ethernet-based lighting system (300), without it being necessary to employ a designated lighting controller and without it being necessary to completely commission the installed lighting system (300). According to an aspect of the invention, this is achieved by providing a network switch (200) that comprises a plurality of ports for coupling luminaires (312A, 312B, 312C, 312D) and sensors and/or actuators (314A, 314B) of the lighting system (300) to the network switch (200); and by setting the network switch (200) such that a signal received at a first port (e.g. port 4) of the plurality of ports is only forwarded to pre-selected ports (e.g. ports 2,3,5,6 and 7) of the plurality of ports.

15 Claims, 4 Drawing Sheets

Related U.S. Application Data

(60) Provisional application No. 61/679,966, filed on Aug. 6, 2012.

(51) Int. Cl.

| | |
|---|---|
| ***F21V 23/04*** | (2006.01) |
| ***H05B 45/00*** | (2020.01) |
| ***H05B 47/10*** | (2020.01) |
| ***H05B 47/185*** | (2020.01) |

(56) References Cited

U.S. PATENT DOCUMENTS

| | | | | |
|---|---|---|---|---|
| 2009/0116579 | A1 | 5/2009 | Abraham et al. | |
| 2009/0184840 | A1 | 7/2009 | Veskovic et al. | |
| 2011/0084628 | A1 | 4/2011 | Welten et al. | |
| 2012/0013252 | A1* | 1/2012 | Eckel | H05B 47/18 315/77 |
| 2012/0271477 | A1* | 10/2012 | Okubo | H04L 12/10 700/297 |
| 2013/0069541 | A1* | 3/2013 | Feri | H05B 41/46 315/152 |
| 2013/0201316 | A1 | 8/2013 | Binder et al. | |
| 2013/0329730 | A1* | 12/2013 | Zhang | H04L 12/4641 370/392 |
| 2014/0029467 | A1* | 1/2014 | Natrajan | G06F 13/4022 370/254 |
| 2015/0230316 | A1* | 8/2015 | Baaijens | G09F 13/00 315/153 |

FOREIGN PATENT DOCUMENTS

| | | | |
|---|---|---|---|
| JP | 2005108593 | A | 4/2005 |
| JP | 2008252208 | A | 10/2008 |
| WO | 2012028981 | A1 | 3/2012 |
| WO | 2012052890 | A1 | 4/2012 |

* cited by examiner

OUT-OF-THE-BOX COMMISSIONING OF A CONTROL SYSTEM

CROSS-REFERENCE TO PRIOR APPLICATIONS

This application is a Continuation of U.S. application Ser. No. 14/419,312, filed Feb. 3, 2015, which claims the benefit of International Application Serial No. PCT/IB2013/056053, filed Jul. 24, 2013, which claims the benefit of U.S. Patent Application No. 61/679,966, filed on Aug. 6, 2012. These applications are hereby incorporated by reference herein.

FIELD OF THE INVENTION

The present invention is directed to a method of operating a lighting system being configured to be coupled to a control network. The present invention is specifically related to lighting system operating methods, to a network switch for use with a lighting system, to a sensor for use with a lighting system and to a luminaire for use with a lighting system. The present invention is further directed to a corresponding computer program.

BACKGROUND OF THE INVENTION

US 2009/0184840 A1 describes a default configuration for a lighting control system. The default configuration for the lighting control system is achieved via a separate circuit that provides electronic photo sensor information over a communication link. The circuit comprises an input for receiving an infrared control signal. The received control signal is then broadcasted. The system can be used within a conventional Digital Addressable Lighting Interface (DALI) network. It is suggested to expand a DALI command word by three bytes and two additional bits.

SUMMARY OF THE INVENTION

It is an object of the present invention to provide means that allow automatic commissioning of a lighting system and preferably a simple and reliable verification of an installed lighting system, in particular an installed lighting system that has not been completely commissioned yet.

According to a first aspect of the invention, a method of operating a lighting system is presented. The lighting system is configured to be coupled to a control network and comprises a plurality of luminaires and at least one sensor or actuator. The method includes the step of providing a network switch that comprises a plurality of ports for coupling devices to the network switch; and the step of configuring the network switch configuring the network switch by defining a first port group for coupling the luminaires and the sensor or actuator to the network switch, the first port group comprising two or more pre-selected ports of the plurality of ports, wherein a broadcast or multicast message received at a port of the first port group is only forwarded to the remaining ports of the first port group, and wherein the first port group does not comprise one or more reserved ports of the plurality of ports.

The method allows easy and simple verification of the installation work without the need to use specific controllers for the sensors and the luminaires and without the need to employ a separate circuit. In short, the method permits out-of-the-box commissioning without the need to employ a separate lighting system controller.

Such a conventional lighting controller exhibits a designated lighting control logic that receives a sensor output signal, generates a designated control signal in dependence on the received sensor output signal, determines recipients for the control signal and forwards the control signal to the determined luminaires, e.g. via a communication bus. By contrast, the proposed use of the network switch (or further network switches described below) does not involve making use of such designated lighting control logic. Thus, the network switch that is employed in the method does not need to exhibit such designated logic, but rather allows auto-commissioning and verification of an installed lighting system based on intelligent addressing, as will be elaborated in more detail below.

In particular, it shall be understood that the method of the first aspect of the present invention does not involve any use of such a conventional lighting controller. Rather, the luminaires of the lighting system are operated on an interim basis by using the network switch only.

Further, the method not only allows verification of the installed lighting system, but also operating the lighting system on a basic level. To achieve these advantages, the network switch can be a conventional network switch that has been slightly modified.

Also, the network switch does not need to be connected to any network to allow said checking and said operating of an installed lighting system. In contrast to an external controller that operates the network switch such that the signal received at a port of the plurality of ports is only forwarded to pre-selected ports of the plurality of ports, it is suggested that the network switch itself is set such that such forwarding occurs autonomously without a further controller. Thus, the network switch itself allows validating and operating the installed lighting system. Therefore, the forwarding to the remaining pre-selected ports of the port group occurs autonomously.

The network switch comprises a plurality of ports, such as 4, 8, 16, 32 or more. A sensor, such as a motion detection sensor or a light intensity sensor, and luminaires, such as a light emitting diode, that are coupled to the network switch, can be supplied with power via the network switch. The sensor broadcasts or multicasts a sensor output signal to the first port to which it is connected. Such a sensor output signal received at the first port of the network switch is only forwarded to the remaining pre-selected ports. Such pre-selected ports are, e.g., identified in the installation plan according to which a lighting system installer installs the luminaires and the sensors. The luminaires that receive such forwarded sensor output signal behave correspondingly, e.g., by turning-on or turning-off according to the sensor output signal or by setting a light intensity value according to a control value included in the sensor output signal.

A lighting system installer can thus immediately validate the functionality of an installed lighting system without the need to perform a complete commissioning and without the need to establish the installed lighting system within the control network. Therefore, the present invention facilitates introducing IP technology in a lighting control system and, in particular, allows speeding up the complete installation and commissioning of a lighting control system.

After verification of the functionality of the installed lighting system, the complete commissioning can be implemented and is likely to succeed, as the installed lighting system has already been verified. Eventually, the lighting system is then controlled by a designated lighting controller coupled to the network switch.

Within the scope of the description of the present invention, the wording "installation" means a first step of setting up a lighting system, wherein the first step includes fixing lighting devices such as luminaires and sensors at their specified locations and connecting these devices operatively, e.g., by using cables and/or wires. This first step is usually done by an electrical installer/an electrician who follows instructions according to the lighting system installation plan.

The term "commissioning" means a second step of setting up a lighting system, wherein the second step includes assigning network addresses to the installed devices, identifying the location of installed devices, associating sensors to luminaires according to a lighting control plan and/or loading control logic to controllers. This second step is usually done by a different person than the electrician who took care of the first step, e.g., by a commissioning engineer, such as a system programmer.

Furthermore, within the scope of the present invention, a network switch can be an active network switch, an Ethernet switch, a network bridge, a network router, such as an IP router, or a combination thereof. It is a device for interconnecting multiple Ethernet devices, in particular luminaires and sensors of a lighting system, and making these act as a single network segment.

In a preferred embodiment, the control network is a wired control network, such as an Ethernet network, and/or the luminaires are interconnected with each other via cables/wires, such as LAN-cables.

It shall furthermore be understood that a sensor in the sense of the present invention can be a motion detection sensor, a light intensity sensor and so forth. It shall additionally be understood that an actuator in the sense of the present invention can be a light switch that is to be operated by a user or otherwise. Such a light switch can be a mechanical light switch, such as a dip switch, a toggle switch, a tumbler switch, and/or an electro-sensitive switch, e.g., a light switch having a touch screen or a switch that is sensitive to voice commands or to electrical commands that are submitted via a remote control. The light switch can also comprise a dimmer and/or a timing control. A light switch can broadcast, multicast or unicast its status, i.e., a light switch output signal, to the network switch port to which it is connected. Such light switch output signal can comprise a simple ON/OFF-command, but it can also comprise further control information, such as dimming value, a timing command and so forth.

It shall also be understood that a luminaire in the sense of the present invention can be any kind of luminaire that is capable of being coupled to a control network. Such a luminaire is, e.g., a light emitting diode (LED) having a LED driver, a LED array, a halogen light, a light bulb, a gas discharge lamp, a laser, a fluorescent lamp/tube and so forth that has a control interface, such as an Ethernet interface.

Further, a port of the network switch is a network port associated with an IP address, not a port for, e.g., connecting a designated power supply for powering the network switch. For instance, the port is a port for connecting a LAN cable, such as an IEEE 802.3-compatible cable, for example an IEEE 803.af ("Power over Ethernet")-compatible cable. According to the prior art, the complete setup of a lighting control system could be very time consuming, since mistakes in the installation and/or malfunction of some installed devices were not detected until the commissioning step. Alternatively, separate controllers were necessary to quickly validate the functionality of an installed lighting system. Thus, the person undertaking the commissioning may have had to call an electrician to fix some devices and/or device connection before being able to proceed with the commissioning. The present invention contributes to speeding up such a complete setup, since the electrician, i.e. the installer, is now able to check at least the basic functionality of the devices she/he has installed. Commissioning of the installed devices consequently does not take place before the basic functionality has been checked by the electrician. Therefore, it can be avoided that the person taking care of the commissioning depends on additional work by the electrician who installed the devices.

Furthermore, an installed lighting system can now be checked without the need for a complete IP network, in other words: without the need to program and operate a specific lighting controller, and without a connection to the Internet at large or a connection to a corporate network. The invention takes into account that a lighting system is usually installed prior to the installation of a control network, i.e., a network that can link lighting controllers to each other and to light management computers. If a new building is under construction, it might occur that the lighting system is set up prior to the control network. Nevertheless, it is now possible to validate at least the basic functionality of a computerized lighting system, even though a control network through which the lighting system will be controlled at a later point in time is not yet operable. Consequently, the lighting system cannot only be validated by the electrician but it can also be operated in the absence of a fully operable control network and is thus available to end users, which is advantageous for persons who are in the building to be constructed and who need light.

The invention is in particular suited to be used in combination with a Philips Light Control Module (Philips LCM) and/or in combination with a Philips Light Master Modular (Philips LMM) system.

In a preferred embodiment, the method of the first aspect of the invention further comprises: coupling the at least one of a sensor and an actuator to a first port of the first port group; coupling one or more of the luminaires to one or more ports of the remaining ports of the first port group; receiving, at the first port, an output signal from the at least one of a sensor and an actuator coupled to the first port; forwarding, by the network switch, the received output signal, to the remaining ports of the first port group; receiving, by the one or more of the luminaires coupled to the one or more remaining ports of the first port group, the forwarded output signal; and setting, by the one or more luminaires coupled to the one or more remaining ports of the first port group, a respective light intensity.

For instance, a sensor output signal is broadcast or multicast to the first port. For instance, the output signal is indicative of the presence or absence of an object in a room/space supervised by the sensor. The luminaires that receive that sensor output signal forwarded by the network switch are turned-on or turned-off in dependence on the presence of the object. Or, the sensor output signal is indicative of daylight intensity. The luminaires that receive such a sensor output signal set their respective light intensity in dependence on the received sensor output signal. Thereby, simple daylight intensity control can be implemented without using a designated lighting system controller. Luminaires coupled to pre-selected ports simply listen to the broadcast or multicast of one or more sensors.

In another preferred embodiment of the method of the first aspect of the invention, the one or more reserved ports of the network switch are reserved for interconnecting further network switches and/or for interconnecting a network controller.

In this embodiment, a sensor connected to the network switch controls luminaires that are connected to the network switch, only, and not luminaires that are connected to a further network switch. Thereby, a respective network switch can be assigned to one lighting system supervision area, such as a corridor side or a window side or to a specific room. For instance, in the case where the network switch has eight ports, ports one and eight are reserved for interconnection of further network switches or of a network controller and ports two to seven define a first Virtual Local Area Network (VLAN). A sensor output signal received at one of the ports two to seven will only be forwarded to the remaining ports of ports two to seven, but not to port one and not to port eight and therefore not to the adjacent further network switches. Thus, in this embodiment, broadcast or multicast sensor or actuator output signals are limited to end devices of a single network switch.

It shall be noted that, in this embodiment, sensors, actuators and luminaires do not need to have any knowledge of the network switches, nor do they need to know to which port they are connected. Also, the network switches do not need to have any knowledge of which devices are present and which devices are connected to which ports, nor do they need to understand/interpret the signal contents of the signals sent by sensors. Therefore, irrespective of to which port a sensor is connected, it can always control luminaires that are connected to the ports belonging to the same pre-defined VLAN group.

In another preferred embodiment of the method of the first aspect of the invention, the step of setting the network switch additionally comprises defining a second port group for coupling the luminaires and the sensor or actuator to the network switch, the second port group comprising two or more further pre-selected ports of the plurality of ports, wherein a further signal received at a further port of the second port group is only forwarded to the remaining ports of the second port group, and wherein the second port group does not comprise ports of the first port group and the one or more reserved ports.

This embodiment is similar to the foregoing embodiment. However, now instead of only one VLAN group associated with one network switch, there are two or more VLANs associated with one network switch due to the port groups. If, e.g., the network switch is assigned to one room only, the first port group can be reserved for sensors or actuators that control luminaires for illuminating a corridor side of that room and the second port group can be reserved for sensors or actuators that control luminaires for illuminating a window side of that room.

Thus, it is preferred that the first port group is coupled to at least one luminaire and at least one sensor or actuator that are associated with a first space of a housing to be illuminated, and that the second port group is coupled to at least one luminaire and at least one sensor or actuator that are associated with a second space of the housing to be illuminated.

The embodiment that includes defining multiple port groups can be combined with the foregoing embodiment in which a signal received at a port is not forwarded to reserved ports. Thus, a sensor or actuator output signal received at a port of the first group is only forwarded to one or more remaining ports of the first port group, not to ports belonging to the second port group and not to the further ports that are reserved for interconnection of further network switches and/or of a network controller.

Still, in this embodiment, the network switches employed in the installed lighting system do not need to know which devices are present and which devices are connected to which ports, nor do they need to contain any lighting control logic. Therefore, irrespective of which port a sensor or actuator is connected to, it can always control luminaires that are connected to the ports belonging to the same pre-defined VLAN group.

In a preferred embodiment, the step of defining port groups comprises the definition of Virtual Local Area Networks and/or the use of a Dynamic Host Configuration Protocol.

The definition of VLANs has already been described above. Preferably, the network switch contains a Dynamic Host Configuration Protocol (DHCP) server. When sensors, actuators and luminaires are connected, the network switch hands out some default DHCP settings to them.

In an IPv4-based network, these settings can include a particular Internet Protocol (IP) address for a sensor or a luminaire, an IP subnet address and a subnet mask according to the IP protocol specifications. For a single port group the network switch may randomly choose a quasi-unique subnet address and a subnet mask for all the pre-defined ports. Or, alternatively, if room separations need to be distinguished, such as, e.g., a window side and a corridor side, a separate subnet address and a subnet mask for every port group is chosen. For example, if a DHCP server of the network switch chooses a subnet address of 10.1.x.x with a subnet mask 255.255.0.0, then 65534 ($=2^{16}-2$; 16 Bit address) subnet addresses are available for random selection, which leads to hardly any collision between two network switches in an installation. If an IP address with a subnet address 10.1.1.x is chosen by the network switch for its sensors and luminaires for the first port group, sensors will broadcast to subnet-wide broadcast address 10.1.1.255 such that all luminaires that share the same subnet address will be able to receive and act accordingly, as they belong to the same port group on the network switch. Similarly, if an IP address with a subnet address 10.1.2.x is chosen by the network switch for its sensors and luminaires for the second port group, sensors connected to this port group will broadcast to subnet-wide broadcast address 10.1.2.255 with subnet address 10.1.2.x.

In IPv6 networks, a DHCP server of the network switch preferably gives out IPv6 addresses in the form of "Prefix::IID", where IID stands for Interface ID. Sensors, actuators and luminaires may use Unicast-Prefix-based IPv6 Multicast addresses for sending and receiving.

The control network named in the disclosure of the present invention is, for instance, an Ethernet-based network, such as an IPv4 or an IPv6-based network. Accordingly, the network switches, luminaires, sensors, and actuators mentioned in this disclosure can be, e.g., network switches, luminaires, sensors, and actuators that are capable of being coupled to an Ethernet-based network.

The lighting system mentioned in the disclosure of the present invention is, for instance, an installed lighting system that has not been commissioned yet.

In accordance with a second aspect of the present invention, a further method of operating a lighting system is presented. The lighting system is configured to be coupled to a control network and comprises a network switch and a plurality of luminaires and at least one sensor coupled thereto. The method includes the steps of acquiring, by the sensor or actuator, a network address for the sensor or actuator;

sending, by the sensor or actuator, a multicast message to the luminaires via the network switch, the multicast message inquiring about a network address associated with a respective luminaire;

in response to the multicast message, sending, by the luminaires, the associated network addresses to the sensor or actuator;

selecting, by the sensor or actuator, at least one of the received network addresses; and unicasting, by the sensor or actuator, an output signal to the at least one selected network address.

Essentially, the method of the second aspect of the present invention has the same advantages as the method of the first aspect of the invention. In particular, the method of the second aspect of the invention can be combined with the method of the first aspect of the invention and the method of the second aspect of the invention has preferred embodiments that correspond to preferred embodiments of the method of the first aspect of the invention. However, for executing the method of the second aspect of the invention, the network switch does not need to be modified at all. Rather, for achieving the out-of-the-box commissioning, only the sensors and luminaires are slightly adapted.

According to the second aspect of the invention, for controlling the luminaires, the sensors unicast to luminaires that are in a same port group instead of broadcasting or multicasting. Before unicasting, sensors find out which luminaires form part of one and the same port group/VLAN defined in the network switch. To do this, sensors can, e.g., just broadcast or multicast to all potential devices to request which luminaires they comprise and the IP addresses of said luminaires. After collecting the IP addresses of peer devices, sensors or switches may unicast their messages to one or more selected luminaires.

The network switch preferably comprises a management interface, via which other devices may inquire about which devices, i.e., which Medium Access Control (MAC) addresses, are connected/assigned to which port of the network switch. Upon powering-up, sensors and luminaires may query the network switch at a preconfigured IP address about what MAC addresses are seen on which ports. This preconfigured IP address is the default IP address where a management interface of the network switch resides. A sensor also discovers to which port on the network switch it is connected. Depending on the pre-configurations of the sensor, it may consider, e.g., ports two to four of the network switch to belong to a window side of a room, and ports five to seven to belong to the corridor side of the room. Ports one and eight are reserved for interconnecting further network switches. The sensor will then try to find out the IP addresses of devices that are connected to the same port group as the sensor itself. Subsequently, it will transmit its sensor output signal, e.g., its status change, only to IP addresses of these devices.

Again, the network switch does not need to have any knowledge of which devices are there and which devices are connected to which ports, nor does the network switch need to contain any lighting control logic.

According to a third aspect of the present invention, a sensor or actuator for a lighting system that comprises at least one network switch and that is configured to be coupled to a control network is presented. The sensor or actuator comprises:

an acquisition unit configured to acquire, from the network switch, a network address for the sensor or actuator;

a transmitter configured to send, via the network switch, a broadcast or multicast message to luminaires of the lighting system, the broadcast or multicast message inquiring about a network address associated with a respective luminaire;

a receiver configured to receive network addresses sent by the luminaires; and a selector for selecting one or more of the received network addresses, wherein the transmitter is further configured to unicast a sensor or actuator output signal only to the selected network addresses.

According to a fourth aspect of the present invention, a luminaire for a lighting system that comprises at least one network switch and that is configured to be coupled to a control network is presented. The luminaire comprises:

an acquisition unit configured to acquire, from the network switch, a network address for the luminaire;

a receiver configured to receive, from a sensor or actuator coupled to the network switch, a broadcast or multicast message, the broadcast or multicast message inquiring about a network address associated with the luminaire;

a transmitter configured to send, in response to the broadcast or multicast message, a network address of the luminaire to the sensor or actuator; and a controller configured to control the luminaire in dependence on an output signal that has been unicast, by the sensor or actuator, to the luminaire.

The sensor of the third aspect of the invention and the luminaire of the fourth aspect of the invention both share the advantages of the methods of the first and the second aspect of the invention. In particular, the sensor and the luminaire have preferred embodiments that correspond to embodiments of the method of the first aspect of the invention. For instance, it is preferred that the sensor and/or the luminaire are configured to be powered via the network switch. It is furthermore preferred that the selector of the sensor is configured to define said port groups and/or to exclude, when unicasting, at least two ports of the network switch that are reserved for interconnection of further network switches.

In a preferred embodiment, the network switch is set such that a signal received at a first port of the plurality of ports is only forwarded to one or more pre-selected ports of the plurality of ports, i.e., it is preferred that the network switch exhibits said pre-defined port groups. Thus, the network switch preferably has some "grouping intelligence". Therefore, the sensor does not need not to have knowledge about the port groups; it only needs to find out the IP addresses of all luminaires in its group in order to send its signal in unicast. To do that, the sensor initially sends out the address request message in broadcast or multicast, and gets responses from the luminaires. After that, the sensor can use unicast to communicate with specific luminaires.

In an alternative embodiment, the "grouping intelligence" is entirely on the side of the sensors and/or luminaires being part of the installed lighting system. Thus, in this embodiment, the network switch does not comprise any set/predefined port groups, such as VLAN groups and/or a DHCP server that gives out different addresses for different port groups. Rather, the sensor retrieves, from the network switch, information about its own port, and further information about what MAC (in case of the network switch being an Ethernet switch) or IP addresses (in case of the network switch being an IP router) there are on the remaining ports of the network switch. Such information is preferably retrieved by the sensor via a management interface of the network switch. The sensor will then decide by itself whether, e.g., ports 2 to 4 of the network switch belong to one group, or, if alternatively, e.g., actually ports 2 to 7 belong to one group. In the aforementioned embodiment, it is not the sensor that determines the port groups, but the port groups are already defined in the network switch.

For example, the sensor is connected to port 6 of the network switch. The sensor determines ports 5 and 7 of the network switch to be in a first port group. Thus, the sensor unicasts to luminaires being coupled to ports 5 and 7, only. For example, the sensor retrieves the addresses of these luminaires coupled to ports 5 and 7 of the switch via the management interface of the switch.

According to a fifth aspect of the present invention, a network switch for a lighting system that is configured to be coupled to a control network and that comprises a plurality of luminaires and at least one sensor or actuator is presented. The network switch comprises:

a plurality of ports for coupling devices to the network switch;

a controller configured to define a first port group for coupling the plurality of luminaires and the at least one of a sensor and an actuator to the network switch, the first port group comprising two or more pre-selected ports of the plurality of ports, wherein a broadcast or multicast message received at a first port of the first port group is only forwarded to the remaining ports of the first port group, and wherein the first port group does not comprise one or more reserved ports of the plurality of ports.

The network switch of the fifth aspect of the invention has the same advantages as the aforementioned aspects of the invention. In particular, the network switch of the fifth aspect of the invention has preferred embodiments that correspond to embodiments of the aforementioned aspects of the invention.

The network switch of the fifth aspect of the invention is preferably configured for determining which port group a sensor or actuator is connected to and which luminaires belong to the same port group as the sensor, by using its own information. Sensors, actuators and luminaires get their addresses either via an auto-address-assigning-procedure (e.g. an auto-IP-procedure) or can be assigned, e.g., by a DHCP server that resides in the network switch.

Sensors can transmit their sensor output signals, such as, e.g., status changes, in broadcast messages or unicast them to the network switch. The network switch forwards received broadcast messages to the ports that belong to the same control port group. Or, instead of simply forwarding, the network switch generates control messages itself and sends the control messages to the luminaires that belong to the same port group.

In a preferred embodiment, the definition of a port group is performed by the network switch by definition of a Virtual Local Area Network or the use of a Dynamic Host Configuration Protocol server configured to provide default Dynamic Host Configuration Protocol settings to luminaires and/or sensors and actuators that are to be connected to the network switch.

According to a sixth aspect of the invention, a computer program for operating a lighting system is presented. The computer program comprises program code means for causing the lighting system to carry out the steps of the method of the first or second aspect of the invention, when the computer program is run on a computer controlling the lighting system.

The computer program of the sixth aspect of the invention may be stored or distributed on a suitable medium, such as an optical storage medium or a solid-state medium supplied together with or as part of other hardware, but may also be distributed in other forms, such as via the Internet or other wired or wireless telecommunication systems.

It shall be understood that the methods of the first and second aspect of the invention, the sensor or actuator of the third aspect of the invention, the luminaire of the fourth aspect of the invention, the network switch of the fifth aspect of the invention and the computer program of the sixth aspect of the invention have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
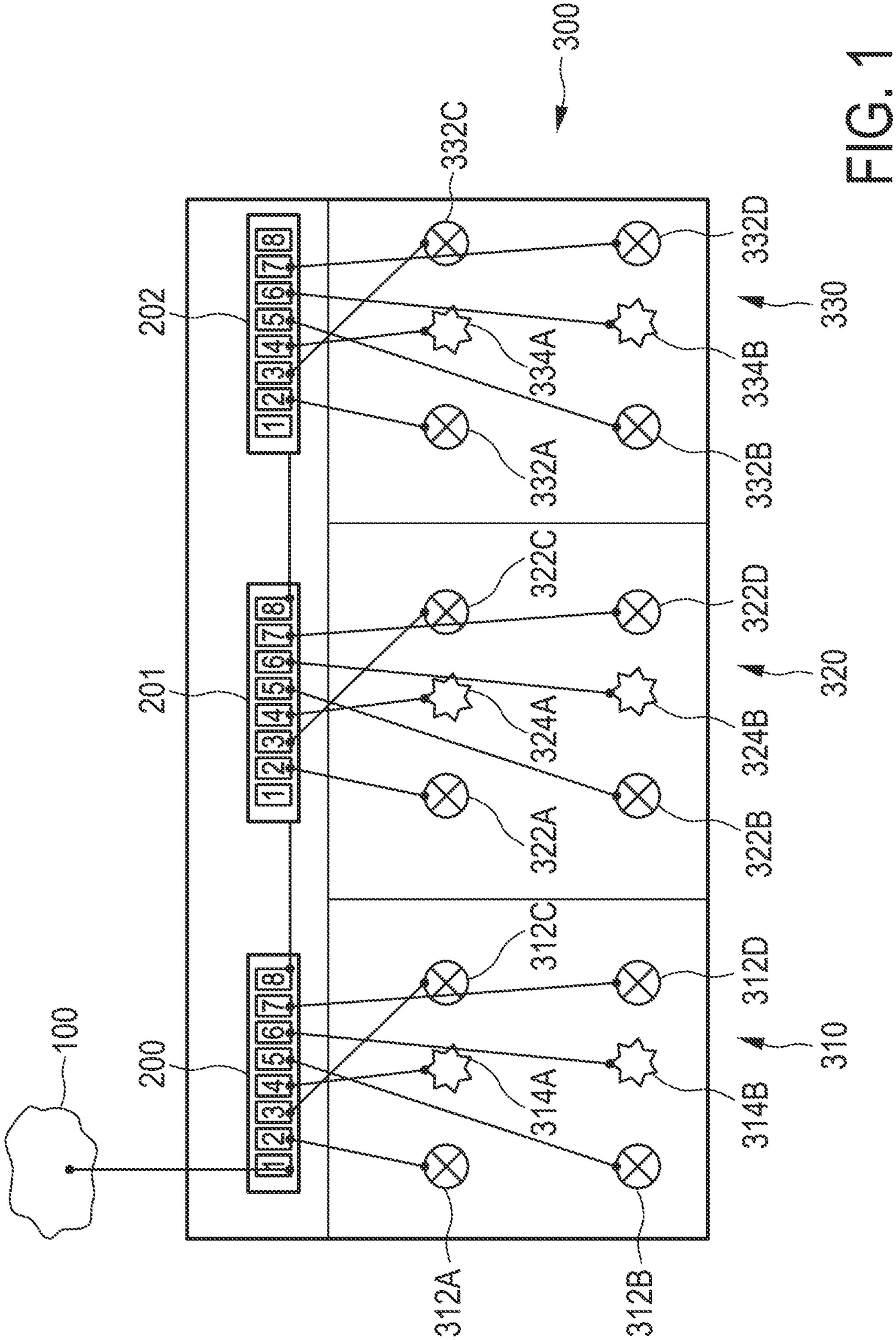
FIG. 1 shows schematically and exemplarily a representation of a lighting system that is operated by means of a method in accordance with a first embodiment of the present invention.

FIGS. 1 to 4 show schematically and exemplarily representations of a lighting system 300 that is operated by means of a method in accordance with various embodiments of the present invention.

The lighting system 300 is an installed lighting system that is coupled to a plurality of network switches 200, 201 and 202, for instance Ethernet switches. These switches are coupled, via switch 200, to a control network 100. However, it will be understood that the coupling to the control network 100 is not necessary for the implementation of any of the methods described hereinafter.

In the illustrated scenarios, each of the network switches 200, 201 and 202 comprises eight ports, namely port 1 to port 8. Two ports are reserved for interconnecting the ports with each other, or for coupling to the control network 100. In the illustrated scenarios, these ports are ports 1 and 8 of each of the network switches 200, 201 and 203. The remaining ports, namely ports 2 to 7, are ports for connecting to luminaires and sensors of the lighting system 300. Certainly, the ports other than ports 1 and 8 could be reserved for connecting to other switches.

The lighting system 300 is logically divided into three divisions 310, 320 and 330, wherein division 310 is coupled to network switch 200, division 320 is coupled to network switch 201 and division 330 is coupled to network switch 202.

The lighting system comprises a plurality of luminaires 312A to 312D, 322A to 322D and 332A to 332D (illustrated as a cross in a circle) and a plurality of sensors 314A, 314B, 324A, 324B, 334A and 334B (illustrated as a star). Here it is to be understood that where the description below mentions sensor, this equally applies to actuator. As described above, the luminaires can be any kind of luminaire that comprises an interface that allows for coupling to a network switch. The sensors can be any kind of sensor that comprises an interface that allows for coupling to a network switch, e.g., a motion detection sensor, a light intensity sensor, a light switch and so forth.

Now, referencing to FIG. 1, the installed lighting system 300 is operated as follows: The network switch 200 is set such that a sensor output signal received from sensor 314A at port 4 and/or from sensor 314B at port 6 is only forwarded to pre-selected ports 2, 3, 5 and 7, but not to ports 1 and 8 that are reserved for connecting to control network 100 (port 1) and the neighboring switch 201 (port 8). For example, sensor 314A is a motion detection sensor that observes an area and broadcasts a sensor output signal in dependence on the presence/non-presence of an object (such as a person) in the observed area. The broadcasted sensor output signal is forwarded to ports 2, 3, 5 and 7 of switch 200, only. Thus, the luminaires 312A, 312B, 314C and 314D act according to the forwarded sensor output broadcast signal submitted by sensor 314A, e.g., by turning on/off or by adapting an emitted light intensity.

Similarly, the network switch 201 illustrated in FIG. 1 is set such that a sensor output signal received from sensor 324A at port 4 and/or from sensor 324B at port 6 is only forwarded, by the network switch 200, to pre-selected ports 2, 3, 5 and 7, but not to ports 1 and 8 that are reserved for connecting to the neighboring network switches 200 (port 1) and 202 (port 8). Correspondingly, network switch 202 is set such that a sensor output signal received from sensor 334A at port 4 and/or from sensor 334B at port 6 is only forwarded to pre-selected ports 2, 3, 5 and 7 of the network switch 202, but not to ports 1 and 8 that are reserved for connecting to the neighboring network switch 201 (port 1) and a further network switch (port 8) that is not illustrated in FIG. 1.

Figure 2:
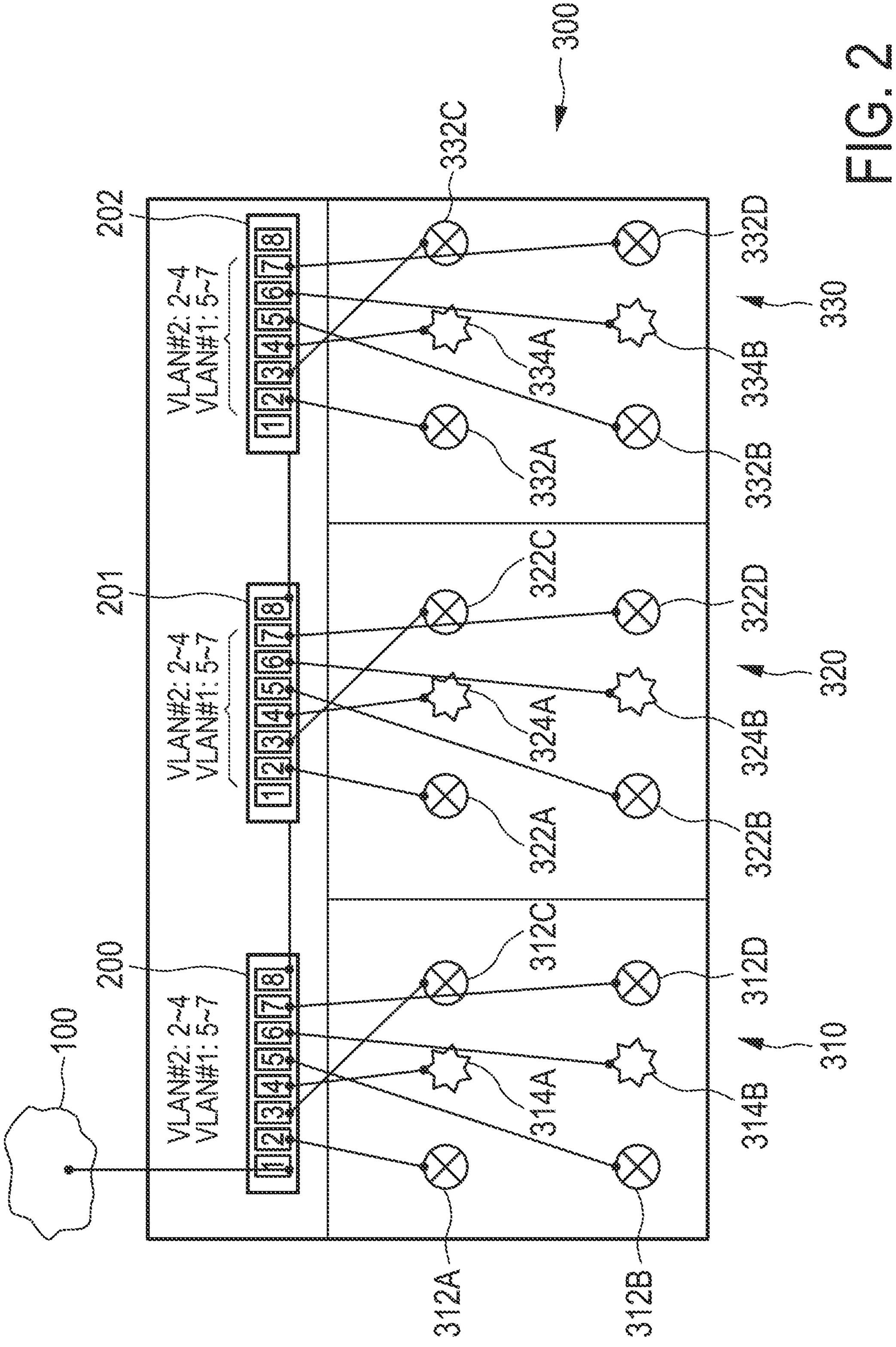
FIG. 2 shows schematically and exemplarily a representation of a lighting system that is operated by means of a method in accordance with a second embodiment of the present invention.

Turning now to FIG. 2, the network switches are set such that a first port group and a second port group are defined for each of the network switches 200, 201 and 202. Generally spoken, a sensor output signal received at a port belonging to the first port group is only forwarded to one or more of the remaining ports of the first port group and another sensor output signal received at a port belonging to the second port group is only forwarded to one or more of the remaining ports of the second port group.

For instance, luminaires 312B, 312 D, 322B, 322 D, 332B and 332 D are installed on a window side of a building, and luminaires 312A, 312 C, 322A, 322 C, 332A and 332 C are installed on a corridor side of a building. It may be desired that luminaires installed on the corridor side are controlled differently from luminaires that are installed on the window side.

In the example illustrated in FIG. 2, network switch 200 has a set VLAN group #1 that comprises ports 5, 6 and 7 and a set VLAN group #2 that comprises ports 2, 3 and 4. The same applies for the network switches 201 and 202, even though, every network switch could certainly be set differently.

Again, the respective ports 1 and 8 are reserved for connecting to further switches or to the control network 100.

Thus, a sensor output signal received from sensor 314A at port 4 of network switch 200 is only forwarded to ports 2 and 3, i.e., to luminaires 312A and 312C installed on a corridor side of a building. Such a sensor signal is not forwarded to the remaining ports of switch 200. Accordingly, a sensor output signal received from sensor 334B at port 6 of switch 202 is only forwarded to ports 5 and 7, i.e., to luminaires 332B and 332D installed on a window side of a building.

In the embodiment of FIG. 2, the sensors can either multicast, broadcast or unicast their respective sensor output signals. Before unicasting, the sensors find out which luminaires are part of the same port group. For instance, sensor 324A broadcasts a request message requesting IP/MAC addresses of the luminaires of the same port group, namely luminaires 322A and 322C. After that, sensor 324A selectively unicasts a sensor output signal to luminaire 322A and/or luminaire 322C, according to which sensors 322A/322C can act.

In order to realize such "out-of-the-box-commissioning", the network switches 200, 201 and 202 can be, e.g., pre-configured Ethernet switches. Such pre-configuring can occur during or after the manufacturing process of the switches.

Figure 3:
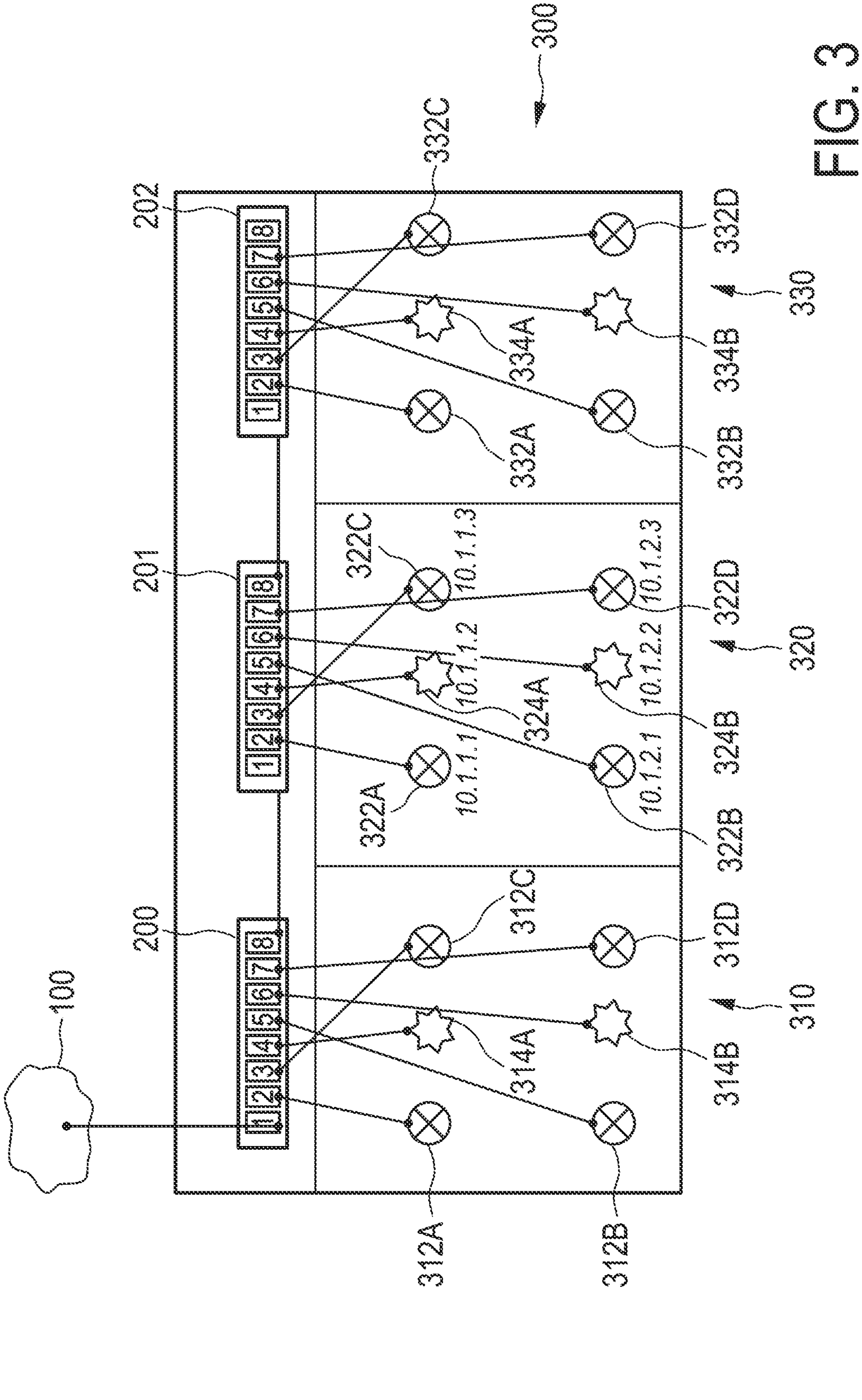
FIG. 3 shows schematically and exemplarily a representation of a lighting system that is operated by means of a method in accordance with a third embodiment of the present invention.

Reference is now made to FIG. 3. In this embodiment, the network switches 200, 201 and 202 each comprise a DHCP server for defining port groups. Thus, in this embodiment, there are no set VLAN groups. The function of said use of a DHCP server will now be explained in detail with respect to network switch 201. It shall be understood that the remaining network switches 200 and 202 can certainly be operated correspondingly.

When sensors 324A and 324B and luminaires 322A to 322 D are connected to network switch 201, the network switch 201 hands out pre-defined DHCP settings to these sensors and luminaires. These settings include a particular IP address for each sensor and each luminaire, an IP subnet address and a subnet mask according to an IP protocol specification. The network switch 201 may randomly choose a quasi-unique subnet address and a subnet mask for all its ports 1 to 8. Or, alternatively, a separate subnet address and a subnet mask for several port groups of network switch 201, e.g., in case of a window side and a corridor side, must be distinguished. For example, if the DHCP server of network switch 201 chooses a subnet address of 10.1.1.x with a subnet mask 255.255.0.0 for a first port group (ports 2, 3 and 4), 65534 subnet addresses are available for random selection, which leads to hardly any collision between two network switches in an installation.

Since, in an example, an IP address with a subnet address 10.1.1.x is chosen by network switch 201 for its sensors and luminaires 322A, 322C and 324A for port group #1 (ports 2, 3 and 4), sensor 324A can broadcast to subnet-wide broadcast address 10.1.1.255, such that all luminaires (322A and 332C) that share the same subnet address (as they belong to the same port group of the network switch 201) will be able to receive and act accordingly. And since an IP address with a subnet address 10.1.2.x is chosen by network switch 201 for its sensors and luminaires 322B, 322D and 324B for port group #2 (ports 5, 6 and 7), sensor 324B can broadcast to subnet-wide broadcast address 10.1.2.255, such that all luminaires (322B and 332D) that share the same subnet address (as they belong to the same port group of the network switch 201) will be able to receive and act accordingly.

Instead of subnet-wide broadcasting, the sensors can also multicast their sensor output signals. In such a case, the DHCP server of network switch 201 chooses randomly a multicast address for every port group of the network switch. The DHCP server informs the multicast address chosen for sensors and luminaires when they ask for an IP address. The sensors then multicast their messages to this configured multicast address.

Instead of subnet-wide broadcasting or multicasting, the sensors can also unicast their sensor output signals. In this case, sensors use subnet-wide broadcasting or multicasting first in order to find what devices are on the subnet and to identify their IP addresses. Alternatively, the sensors can also unicast to the network switch or to the DHCP server in order to inquire which devices are currently on the subnet. Subsequently, the sensors can unicast their sensor output signals (e.g., status changes) to every luminaire that they have identified. In this alternative embodiment, the network switches need to hand out IP addresses for the connected luminaires and sensors.

Figure 4:
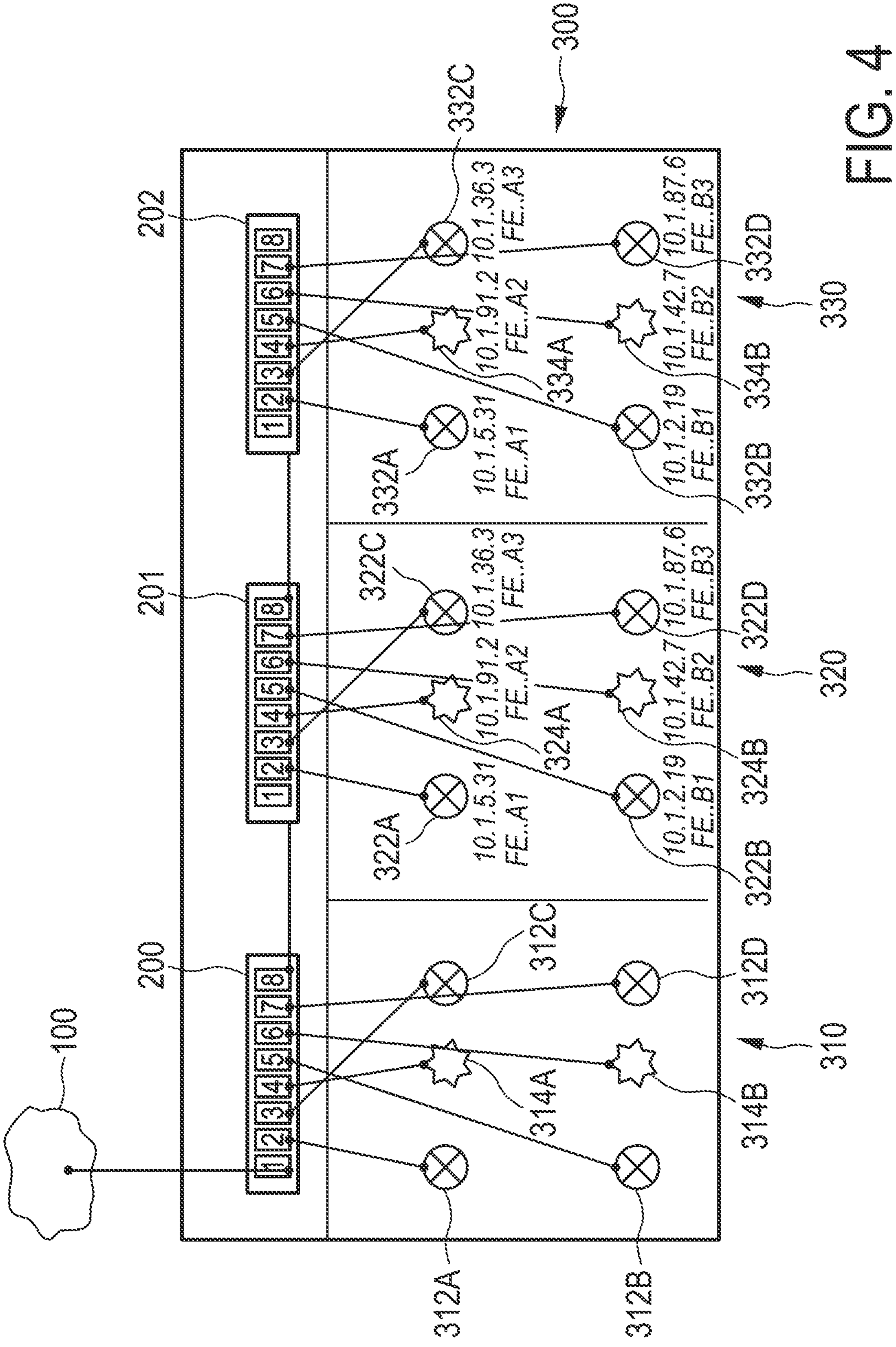
FIG. 4 shows schematically and exemplarily a representation of a lighting system that is operated by means of a method in accordance with a fourth embodiment of the present invention.

Reference is now made to FIG. 4. In this embodiment, the network switches build up their own database for defining port groups and for realizing the forwarding of received sensor output signals.

First, an IP address is assigned to every connected luminaire and every connected sensor, e.g. via an auto IP-procedure or via an integrated DHCP server. The network switch stores the assigned IP addresses associated with every port. Based on stored IP addresses, port groups are defined. For instance, network switch 201 has the following defined port groups:

Port 2: Group #1—IP address: 10.1.5.31/MAC address: FE..A1

Port 3: Group #1—IP address: 10.1.91.2/MAC address: FE..A2

Port 4: Group #1—IP address: 10.0.36.3/MAC address: FE..A3

Port 5: Group #2—IP address: 10.0.2.19/MAC address: FE..B1

Port 6: Group #2—IP address: 10.0.42.7/MAC address: FE..B2

Port 7: Group #2—IP address: 10.0.87.6/MAC address: FE..B3

Certainly, the network switches 200 and 202 can have the same or other defined port groups.

The random distribution of IP addresses shall also indicate that the network switch 201 (and/or the other network switches depicted in FIG. 4) forwards a received sensor output signal to preselected luminaires in a "more intelligent" way.

Again, ports 1 and 8 of each network switch are reserved for connecting to further network switches or to the control network 100.

For instance, the sensors 314A, 314B, 324A, 324B, 334A and/or 334B broadcast, multicast or unicast their sensor output signal to the network switches. The network switch forwards a received sensor output signal only to pre-selected ports, namely those which belong to the same port group. This can simply be done by checking the IP address/the MAC address of the received sensor output signal and by identifying the IP addresses/the MAC addresses that are associated with the same group. For instance, if sensor 324B that is connected to port 6 of network switch 201 broadcasts a sensor output signal, such a signal is only forwarded to ports 5 and 7, i.e., to luminaires 322B and 322D with IP addresses 10.0.2.19 and 10.0.87.6, since the network switch 201 knows that these luminaires belong to the same port group as sensor 324B.

In the embodiments described above, the lighting system was coupled to three network switches, wherein each of the switches comprised 8 ports. Certainly, the invention is not limited to such a scenario. For instance, there can be more or fewer than three switches and the switches can comprise more or fewer than 8 ports.

It shall be understood that an arrangement of elements of a figure predominately serves to provide a plausible description; it does not relate to any actual geometric arrangement of parts of a manufactured device according to the invention.

In the claims, the word "comprising" does not exclude other elements or steps, and the indefinite article "a" or "an" does not exclude a plurality.

A single unit or device may fulfill the functions of several items recited in the claims.

Any reference signs in the claims should not be construed as limiting the scope.

Summarizing, the present invention is related to verifying an installed lighting system, in particular an Ethernet-based lighting system, without the need to employ a designated lighting controller and without the need to completely commission the installed lighting system. According to an aspect of the invention, this is achieved by providing a network switch that comprises a plurality of ports for coupling luminaires and sensors of the lighting system to the network switch; and by setting the network switch such that a signal received at a first port of the plurality of ports is only forwarded to pre-selected ports of the plurality of ports.

The invention claimed is:

1. A method of operating a connected system, the connected system being configured to be coupled to a control network and comprising a plurality of nodes and at least one of a sensor and an actuator, the method including the steps of:

providing a network switch that comprises a plurality of ports for coupling devices to the network switch;

configuring the network switch by defining a first port group for coupling the nodes and the at least one of a sensor and an actuator to the network switch, wherein the first port group comprises two or more pre-selected ports of the plurality of ports, wherein a broadcast or multicast message received at a port of the first port group from at least one of sensor and actuator is only forwarded to the remaining ports of the first port group, and thereby to the devices connected to those ports, and wherein the first port group does not comprise one or more reserved ports of the plurality of ports; and operating the connected system via the network switch prior to connecting to a control network.

2. The method according to claim 1, additionally comprising the steps of:

coupling the at least one sensor and actuator to a first port of the first port group;

coupling one or more of the nodes to one or more ports of the remaining ports of the first port group;

receiving, at the first port, an output signal from the at least one of a sensor and an actuator coupled to the first port;

forwarding, by the network switch, the received output signal, to the remaining ports of the first port group;

receiving, by the one or more of the nodes coupled to the one or more remaining ports of the first port group, the forwarded output signal; and setting, by the one or more nodes coupled to the one or more remaining ports of the first port group, a respective signal intensity.

3. The method according to claim 1, wherein the one or more reserved ports of the network switch are reserved for at least one of: i) interconnecting further network switches, and ii) connecting a network controller of the control network.

4. The method according to claim 1, wherein the step of configuring the network switch additionally comprises:

defining a second port group for coupling the nodes and the at least one sensor and actuator to the network switch, wherein the second port group comprises two or more further pre-selected ports of the plurality of ports, wherein a further signal received at a further port of the second port group is only forwarded to the remaining ports of the second port group, and wherein the second port group does not comprise ports of the first port group and the one or more reserved ports.

5. The method according to claim 4, wherein the step of defining a port group comprises the definition of a Virtual Local Area Network or the use of a Dynamic Host Configuration Protocol.

6. The method according to claim 5, wherein the Dynamic Host Configuration Protocol is used and wherein the step of defining a port group comprises:

assigning, by the network switch, a subnet address to the port group that is different from subnet addresses assigned to further port groups defined for the network switch.

7. The method according to claim 1, wherein the plurality of nodes and the at least one sensor and actuator are coupled to the network switch according to a connected system plan.

8. The method according to claim 1, wherein the control network is an Ethernet-based network and the network switch is at least one of an Ethernet switch, Ethernet bridge, and an Ethernet IP router.

9. The method according to claim 1, wherein the network switch is a Power-over-Ethernet network switch, and wherein the method additionally comprises:

supplying, by the network switch, power to the plurality of nodes and to the at least one sensor and actuator via network cables connecting the network switch with the plurality of nodes and the at least one of a sensor and an actuator.

10. The method according to claim 1, additionally comprising the steps of coupling the at least one sensor and actuator to a first port of the first port group;

coupling one or more of the nodes to one or more ports of the remaining ports of the first port group;

acquiring, by the at least one sensor and actuator, a network address for the at least one sensor and actuator;

sending, by the at least one sensor and actuator, one of a broadcast and a multicast message to the nodes via the network switch, the one of a broadcast and a multicast message inquiring about a network address associated with a respective node;

in response to the one of a broadcast and a multicast message, sending, by the nodes, the associated network addresses to the at least one sensor and actuator;

selecting, by the at least one sensor and actuator, at least one of the received network addresses; and sending, by the at least one sensor and actuator, a unicast message comprising an output signal from the at least one sensor and actuator to the at least one selected network address.

11. A network switch for a connected system that is configured to be coupled to a control network and that comprises a plurality of nodes and at least one of a sensor and an actuator, the network switch comprising:

a plurality of ports for coupling devices to the network switch;

a controller configured to define a first port group for coupling the plurality of nodes and the at least one of a sensor and an actuator to the network switch, wherein the first port group comprises two or more pre-selected ports of the plurality of ports, wherein a broadcast or multicast message received at a first port of the first port group is only forwarded to the remaining ports of the first port group, and wherein the first port group does not comprise one or more reserved ports of the plurality of ports, and wherein the network switch is configured to operate the connected system prior to connecting to a control network.

12. The network switch of claim 11, wherein the definition of the first port group comprises the definition of a Virtual Local Area Network or the use of a Dynamic Host Configuration Protocol.

13. A sensor or an actuator for a connected system that comprises at least one network switch and that is configured to be coupled to a control network, the sensor or actuator comprising:

an acquisition unit configured to acquire, from the network switch, a network address for the sensor or actuator;

a transmitter configured to send, via the network switch, one of a broadcast and a multicast message to nodes of the connected system, the message inquiring about a network address associated with a respective node;

a receiver configured to receive network addresses sent by the respective node in response to the message inquiring about the network address; and a selector for selecting one or more of the received network addresses, wherein the transmitter is further configured to unicast a sensor or actuator output signal only to the one or more selected network addresses.

14. A node for a connected system that comprises at least one network switch and that is configured to be coupled to a control network, the node comprising:

an acquisition unit configured to acquire, from the network switch, a network address for the node;

a receiver configured to receive, from a sensor or actuator coupled to the network switch, one of a broadcast and a multicast message, the message inquiring about a network address associated with the node;

a transmitter configured to send, in response to the one of a broadcast and a multicast message, a network address of the node to the sensor or actuator; and a controller configured to control the node in dependence on an output signal comprised in a unicast message sent by the sensor or actuator to the node.

15. A computer program for operating a connected system, the computer program comprising program code means for causing the connected system to carry out the steps of the method as defined in claim 1, when the computer program is run on a computer controlling the connected system.

* * * * *